(12) United States Patent
Aly

(10) Patent No.: US 10,902,960 B2
(45) Date of Patent: Jan. 26, 2021

(54) ALTERNATING OFFSET U-BEND SUPPORT ARRANGEMENT

(71) Applicant: BWXT Canada Ltd., Cambridge (CA)

(72) Inventor: Kareem M. A. Aly, Charlotte, NC (US)

(73) Assignee: BWXT Canada Ltd., Cambridge (CA)

( * ) Notice: Subject to any disclaimer, the term of this patent is extended or adjusted under 35 U.S.C. 154(b) by 0 days.

(21) Appl. No.: 16/934,479

(22) Filed: Jul. 21, 2020

(65) Prior Publication Data

US 2020/0350085 A1 Nov. 5, 2020

Related U.S. Application Data

(63) Continuation of application No. PCT/IB2018/053205, filed on May 8, 2018.
(Continued)

(51) Int. Cl.
*G21C 15/22* (2006.01)
*F22B 37/20* (2006.01)
(Continued)

(52) U.S. Cl.
CPC .............. *G21C 15/22* (2013.01); *F22B 1/023* (2013.01); *F22B 37/205* (2013.01); *F28D 7/06* (2013.01);
(Continued)

(58) Field of Classification Search
CPC ........ G21C 15/22; F22B 1/023; F22B 37/205; F28D 7/06; F28D 9/013
See application file for complete search history.

(56) References Cited

U.S. PATENT DOCUMENTS 3,941,187 A * 3/1976 Jabsen .................... G21D 1/00
165/157
4,747,373 A * 5/1988 Wepfer ................ F22B 37/206
122/493
(Continued)

FOREIGN PATENT DOCUMENTS

WO    WO-2019150180 A1 *  8/2019  ............. F28F 9/013

OTHER PUBLICATIONS

Thomas, S.; International Search Report from corresponding PCT Application No. PCT/IB2018/053205; search completed Apr. 18, 2018.

*Primary Examiner* — Lily C Garner
(74) *Attorney, Agent, or Firm* — Blake, Cassels & Graydon LLP; Christopher N. Hunter; Laurie Wright

(57) ABSTRACT

Arrangement for supporting U-bend tube sections in the high heat environment of steam generators using flat bars. The invention uses a combination of thicker and thinner flat bars to impart a serpentine path to the arc of the normally curvilinear U-tubes. The support system accommodates the dilation and contraction of coolant tubes and other elements caused by the extreme and varying conditions inside a steam generator, and which can cause gaps between coolant tubes and prior art tube support bars. Bars of alternating thickness provide alternating offsets to tensionally push and support each tube on multiple sides and in multiple locations, and this tension keeps the tubes in contact with at least some flat bars on multiple sides regardless of size and shape changes. Support arrangement includes a set of fan bars, each fan bar including thick and thin flat bars projecting up and out from a collector bar.

20 Claims, 5 Drawing Sheets

Related U.S. Application Data

(60) Provisional application No. 62/625,813, filed on Feb. 2, 2018.

(51) Int. Cl.
*F28D 7/06* (2006.01)
*F28F 9/013* (2006.01)
*G21D 1/00* (2006.01)
*G21C 15/14* (2006.01)
*G21C 15/24* (2006.01)
*G21C 15/243* (2006.01)
*F22B 1/02* (2006.01)

(52) U.S. Cl.
CPC .............. *F28F 9/013* (2013.01); *G21C 15/14* (2013.01); *G21C 15/24* (2013.01); *G21C 15/243* (2013.01); *G21D 1/00* (2013.01)

(56) References Cited

U.S. PATENT DOCUMENTS

| | | | | |
|---|---|---|---|---|
| 5,127,469 | A | * | 7/1992 | Boula ................... F22B 37/206 165/69 |
| 6,772,832 | B2 | * | 8/2004 | Schneider ............. F22B 37/206 165/162 |
| 6,997,141 | B2 | * | 2/2006 | Sun ....................... F22B 37/205 122/510 |
| 8,794,302 | B2 | * | 8/2014 | Schneider ............. F28F 9/0132 165/162 |
| 2003/0196786 | A1 | | 10/2003 | Schneider |
| 2009/0020273 | A1 | * | 1/2009 | Schneider ............... F22B 37/20 165/162 |
| 2016/0061441 | A1 | * | 3/2016 | Matsubara ............. F28F 9/013 122/510 |
| 2016/0300628 | A1 | * | 10/2016 | Fortino .................. G21C 1/322 |

* cited by examiner

ALTERNATING OFFSET U-BEND SUPPORT ARRANGEMENT

CROSS-REFERENCE TO RELATED APPLICATIONS

This application is a continuation of PCT Application No. PCT/B2018/053205 filed May 8, 2018 which claims the benefit of priority of U.S. Provisional Patent Application No. 62/625,813 filed Feb. 2, 2018, both hereby incorporated by reference in their entireties.

FIELD AND BACKGROUND OF INVENTION

The present invention relates generally to nuclear steam generators, to heat exchangers, and in particular to a new and useful assembly and method for use in steam generators which employ U-tube units.

Typically pressurized steam generators or heat exchangers associated with nuclear power stations transfer reactor-generated heat from a primary coolant to a secondary coolant, which secondary coolant in turn drives the plant turbines to generate electricity. Steam generators are heat exchangers used to convert water (the secondary coolant) into steam from heat produced in a nuclear reactor core, and carried to the steam generator(s) via primary coolant.

In commercial power plants typical steam generators might measure up to 70 feet (~21 m) in height and weigh as much as 800 tons. Each steam generator may contain approximately 3,000 to 16,000 tubes, each with a diameter of approximately 0.75 inches. The primary coolant, which may be water, is maintained at high pressure to prevent boiling. The primary coolant is pumped through the nuclear reactor core to absorb heat, and then out of the hot reactor core towards a steam generator. The hot primary coolant is then typically pumped to the steam generator by coolant pumps where it passes on the heat energy to the secondary coolant, before returning to the reactor core once again. This is referred to as the primary loop.

One common type of steam generator used in nuclear power plants uses a vertical recirculating U-tube unit. Typically (primary) reactor coolant enters at a side of the steam generator and flows up a large set of narrow U-tubes until at a certain point the tubes turn sideways and then back downwards again in a rainbow-shaped bundle. The primary coolant then continues through the set of narrow U-tube tubes down towards the bottom of the steam generator, out of the steam generator, and back towards the reactor for reheating. The tubes carrying hot primary coolant are typically surrounded by secondary coolant, at least up to a certain level, with the secondary coolant absorbing heat, through the many tubes, from the primary coolant. Typically the top, rainbow or U-shaped portions of the tubes—the U-bend section—are covered with a saturated steam-water mixture. As the feedwater/secondary coolant pool absorbs heat, saturated steam is produced. The steam may then be forced through moisture separators at the top at the top of the steam generators where the steam is "dried" before it exits through headers carrying it towards the turbine. Moisture extracted from the steam is recirculated to the feedwater/secondary coolant pool surrounding the U-tubes where it absorbs additional heat.

For a general description of the characteristics of nuclear steam generators, the reader is referred to Chapter 48 of *Steam/its generation and use,* 41st Edition, Kitto and Stultz, Eds., © 2005 The Babcock & Wilcox Company, Barberton, Ohio, U.S.A., the text of which is hereby incorporated by reference for use with this invention as though fully set forth herein.

SUMMARY OF INVENTION

This invention provides an improved arrangement for supporting U-bend tube sections in the high heat environment of steam generators. The improvement includes using a combination of thicker and thinner flat bars to laterally support the tubes and to impart a serpentine path to the arc of the normally curvilinear U-tubes. The improved support system is particularly useful for accommodating the dilation and contraction of coolant tubes and other elements caused by the extreme and varying conditions inside a steam generator, and which can cause troublesome gaps between coolant tubes and prior art tube support bars. Bars of alternating thickness provide alternating offsets to tensionally push and support each tube on multiple sides and in multiple locations, and this tension keeps the tubes in contact with at least some flat bars on multiple sides regardless of size and shape changes.

The invention can be used with a steam generator for use in a power plant, including but not limited to a nuclear power plant. The steam generator may comprise a plurality of generally parallel tubes for receiving hot primary coolant from a nuclear reactor core, and for circulating said primary coolant within the steam generator for transferring heat from the primary coolant, through the tubes, and into surrounding secondary coolant for heating the secondary coolant, typically water, to produce steam.

Typically a first vertical portion of each of the tubes is generally vertical for carrying primary coolant received from the reactor upwards, and a different second vertical portion of each of the tubes is generally vertical for carrying primary coolant back downwards and eventually out of the steam generator and back towards the reactor for re-heating. Two tubes carrying the primary coolant up and then back down will often be parallel to one another.

Often the plurality of tubes collectively comprise a U-bend section, the U-bend section comprising a bending, upwardly convex portion of each of the tubes which connects the first vertical portion of each tube with the second vertical portion of each respective tube for passage of primary coolant between respective vertical portions. The U-bend section will often have a rainbow shape, although it will be understood that other shapes can be used to the same effect and can be used with the support structures of this invention.

The steam generator includes a U-bend support assembly for supporting the tubes in the U-bend section, the U-bend support assembly typically being in a fixed position within the steam generator and being at least partially encompassed by the U-bend section. The support assembly is provided, among other reasons, to prevent rainbow-shaped U-bend tubes from bending or folding over or outwards during operation under their own weight and under the intense conditions of steam generation.

Preferably the U-bend support assembly includes a large number of fan bar assemblies, the fan bar assemblies being in fixed positions relative to each other. The number of fan bar assemblies in some embodiments is equal to, or one more or one less than, the number of rows of U-tubes so that the fan bar assemblies can be positioned between each parallel row of U-tubes, and also optionally at each end of a battery of rows of U-tubes.

Typically each fan bar assembly comprises a laterally projecting collector bar and a plurality of flat bars projecting from the collector bar, with the collector bar and its corresponding flat bars all substantially within a common plane. In one embodiment the flat bars all project generally upwards from the collector bar and also, to varying degrees, also towards a side. The collector bar may be generally horizontal, but is not necessarily so. It will also be understood that the flat bars can vary in number and positioning, and should be tailored for use with the particular set of tubes to be supported.

Preferably the fan bar assemblies of the U-bend support assembly are positioned laterally adjacent to one another such that the collector bars of the fan bar assemblies are lined up parallel to one another, and such that the flat bars project upwards between neighboring tubes or rows of tubes in the U-bend section and thereby limit the motion of those tubes, particularly side-to-side motion. The collector bars may all be lined up next to each other in a common plane, in addition to being parallel.

Preferably the tubes in the U-bend section each pass between multiple pairs of flat bars, with each pair of flat bars being formed by two flat bars of adjacent fan bar assemblies. The pairs of flat bars may be perfectly lined up, with respective flat faces facing each other. Alternatively, the "pairs" may be formed by two flat bars which are slightly or fully offset, so their faces only partially face each other or face slightly to the side of each other. Each flat bar (other than those on the extreme ends of the support assembly) will often actually be a part of two pairs, forming one pair with a corresponding flat bar on each opposite side.

Each flat bar has a thickness, the thickness typically describing a dimension normal to the common plane which the flat bar shares with the collector bar and other flat bars in its respective fan bar assembly. In a typical embodiment, flat bars are elongated (generally upwards) bars, being flattened out in a different, side-to-side dimension, and relatively thin in a third dimension, somewhat like a piece of lumber. The "thickness" will be this third, usually thinnest, dimension.

In preferred fan bar assemblies implementing the invention, the flat bars do not all have the same thickness. Some flat bars in the assembly may be thick flat bars, with other flat bars being thin flat bars which are thinner than the thick flat bars. The exact thicknesses of each will vary between embodiments, with the variation being a key concept.

Preferably at least some pairs of flat bars are asymmetrical pairs. Asymmetrical pairs refers to a pair composed of a thick flat bar of one fan bar assembly and a thinner flat bar of an adjacent flat bar assembly which are adjacent to each other. Typically one or more U-tubes will pass between the thin and the thick bar, with the asymmetrical pair slightly altering the path of the tube by holding it towards one side or another. Commonly it will be the thicker flat bar of the pair that contacts the U-tube and holds it in towards one side, helping to impart an overall serpentine, weaving shape in the U-bend portion of the tubes.

Preferably at least some of the tubes within the U-bend section each pass through a plurality of asymmetrical pairs of flat bars, with a portion of each of said tubes being laterally displaced by the thick flat bar of at least one asymmetrical pair, and with part of said tubes having a serpentine shape caused by said displacement. In preferred embodiments most of all of the tubes in the U-bend section pass through a series of asymmetrical flat bar pairs to create a serpentine path. A similar effect can also be achieved by flat bars which are not arranged in adjacent pairs.

In some embodiments one or more tubes passing through the U-bend section each pass through a plurality of asymmetrical pairs of flat bars, with said tubes each being laterally deflected in a first direction by a thick flat bar of at least one asymmetrical pair, and with different portions of said same tubes being laterally deflected in a different second direction by the thick flat bar of a different asymmetrical pair. A similar effect can also be achieved by flat bars which are not arranged in adjacent pairs.

Preferably parts of the tubes are tensionally held against flat bars, most often thick flat bars, on opposite sides of the tubes along their lengths, thereby supporting said tubes against movement in at least two different directions at a multiple positions.

The U-bend section will often be hemispherical, but may also have other shapes.

In some embodiments the collector bars of the fan bar assemblies are substantially horizontal. In some embodiments the flat bars of each collector bar are all tilted in the same direction with respect to a line normal to the collector bar.

Preferably the tubes each pass between the collector bars of adjacent fan bar assemblies both where they enter and where they leave the U-bend section. In this way, the collector bars can function to stabilize the tubes in the same manner as the flat bars.

In some instances at least some of the fan bar assemblies comprise three or more flat bars. Different fan bar assemblies in each installation may have different numbers of fan bars. For example, when supporting a hemispherical U-tube section, the fan bars near the "equator" of the U-tube section may have more flat bars (to support larger and longer tube arcs) than the fan bars near the poles of the hemispherical section (which have smaller arcs and require fewer supports).

Preferably one or more arch bars are each connected to a plurality of flat bars in different fan bar assembles, thereby fixing the flat bars connected to each arch bar with respect to each other. Typically the flat bars connected by each arch bar are generally in line with one another, either directly lined up face-to-face, or slightly offset. In preferred embodiments all of the flat bars are in lines, and all of the flat bars are also fixed to a respective arc bar which ties each line of flat bars together for stability. In some embodiments the arc bars are arced or semi-circular, and are positioned over spans of a hemispherical U-tube section.

In some embodiments one or more tie tubes surround at least a portion of the U-bend section, with each tie tube fixed to a plurality of arch bars, thereby fixing said plurality of arch bars with respect to each other. The tie tubes may be spherical tubes positioned on top of a hemispherical U-tube section and fixed to arc-bars at the top of the U-tube section.

In one aspect of the invention the U-bend support assembly comprises at least five fan bar assemblies, each fan bar assembly comprising a plurality of flat bars projecting from a collector bar, and with the collector bars of said at least five fan bar assemblies being lined up parallel to one another. Often there will be dozens of fan bar assemblies in each support assembly.

Preferably the fan bar assemblies collectively form at least one row of flat bars, with each row of flat bars comprising one flat bar from each fan bar assembly, and with each row of flat bars running transverse to the orientation of the collector bars. Often there will be more than one row of fan bars, such as 2-12, 2-8, 4-6, 4-8, 4-10 or 4-16 rows.

wherein the flat bars in each row may be either directly lined up or in a staggered line.

A set of neighboring fan bar assemblies, such as at least five fan bar assemblies, can collectively form at least one row of flat bars, with each row of flat bars comprising one flat bar from each fan bar assembly. The flat bars in each row may be either directly lined up or in a staggered line. Each row of flat bars typically running transverse to the orientation of the collector bars, sometimes perpendicular to the collector bars. Multiple rows of flat bars may be parallel to one another.

In one embodiment, a given row of flat bars includes a series of neighboring flat bars, such as at least five, ten, fifteen, or twenty flat bars, which alternate between thick flat bars and thin flat bars. The alternation refers to each thin flat bar being adjacent to two thick flat bars on opposite sides, and to each thick flat bar being adjacent to two thin flat bars on opposite sides. In such a case, each adjacent pair of alternating thick and thin flat bars forms an asymmetrical pair of flat bars, possibly excluding bars at the end of each series.

In one aspect of the invention the U-bend support assembly comprises at least ten fan bar assemblies, each fan bar assembly comprising a plurality of flat bars projecting from a collector bar, and with the collector bars of said at least ten fan bar assemblies being lined up parallel to one another. The at least ten fan bar assemblies may collectively form at least two rows of flat bars, with each row of flat bars comprising one flat bar from each fan bar assembly, wherein the flat bars in each row may be either directly lined up or in a staggered line, and with each row of flat bars running transverse to the orientation of the collector bars. The at least two rows of flat bars may each include at least five consecutive neighboring flat bars which alternate between thick flat bars and thin flat bars, with each adjacent pair of said alternating thick and thin flat bars forming an asymmetrical pair of flat bars.

In another embodiment at least some of the asymmetrical pairs are formed by a thick flat bar and a thin flat bar from adjacent fan bar assemblies, with the thick flat bar and the thin flat bar being lined up and having faces which directly oppose each other.

In some implementations, at least some of the asymmetrical pairs are formed by a thick flat bar and a thin flat bar from adjacent fan bar assemblies, with the thick flat bar and the thin flat bar being adjacent to each other but having faces which are at least partially offset and not directly facing each other.

A preferred example consists of steam generator for use in a nuclear power plant, the steam generator comprising a plurality of generally parallel tubes for receiving hot primary coolant from a nuclear reactor core, and for circulating said primary coolant within the steam generator for transferring heat from the primary coolant, through the tubes, and into surrounding secondary coolant for heating the secondary coolant to produce steam. A first vertical portion of each of the tubes is generally vertical for carrying primary coolant upwards, and a different second vertical portion of each of the tubes is generally vertical for carrying primary coolant back downwards. The plurality of tubes collectively comprise a U-bend section, the U-bend section comprising a bending, upwardly convex portion of each of the tubes which connects the first vertical portion of each tube with the second vertical portion of each respective tube for passage of primary coolant between respective vertical portions. The steam generator further comprises a U-bend support assembly supporting the tubes in the U-bend section, with the U-bend support assembly comprising a plurality of fan bar assemblies. Each fan bar assembly preferably comprises a collector bar and one or more flat bars projecting from the collector bar, wherein the collector bar and its corresponding flat bars are all substantially within a common plane. The fan bar assemblies of the U-bend support assembly are positioned laterally adjacent to one another such that the collector bars of the fan bar assemblies are adjacent to one another, and such that the flat bars in each fan bar assembly project between neighboring tubes in the U-bend section and thereby limit the motion of those tubes. The tubes in the U-bend section each pass between one or more pairs of flat bars, with each pair of flat bars being formed by flat bars of adjacent fan bar assemblies. The flat bars do not all have the same thickness, with some flat bars being thick flat bars and other flat bars being thin flat bars which are thinner than the thick flat bars. At least some of the tubes within the U-bend section contact and are deflected by one or more flat bars, typically thick flat bars, and part of said tubes having a serpentine shape caused by the displacement by alternating thickness flat bars.

Typically the tubes in the U-bend section each pass between flat bars on two opposite first and second sides of each tube, wherein the tubes each pass both thick flat bars and thin flat bars on their first side, and also pass both thick flat bars and thin flat bars on their second side. The first and second sides may be left and right sides. The tubes are thereby each contacted and maintained in a laterally displaced position by one or more flat bars from both their first side and their second side, and parts of the tubes are thereby maintained in a serpentine orientation, including as the tubes and other apparatus expand, contract, and move under the influence of temperatures, turbulence, and pressure.

Preferably the U-bend support assembly comprises at least five fan bar assemblies, often dozens of fan bar assemblies, each fan bar assembly comprising a plurality of flat bars projecting from a collector bar, and with most or all of the collector bars the fan bar assemblies being lined up parallel to one another. The collector bars may also be in two or more offset bands, with the collectors bars in beach bank being mutually parallel and/or within a common plane.

Groups fan bar assemblies collectively form at least one row of flat bars, with each row of flat bars comprising one flat bar from each fan bar assembly in a row. The flat bars in each row may be either directly lined up or in a staggered line, for example, alternating between bars positioned just to the left and just to the right of a center line corresponding to the overall direction of the row. Each such row of flat bars typically runs transverse to the orientation of the collector bars, sometimes fully perpendicular to the collector bars. In one embodiment, throughout all or part of each row, there is one-to-one alternation between thin and thick flat bars.

In some embodiments one or more elongated arch bars are each connected to a plurality of flat bars in different fan bar assemblies, thereby fixing the flat bars connected to each arch bar with respect to each other. Each arch bar may follow a row of flat bars, and run transverse or fully perpendicular to the direction of the cross bars.

In some embodiments, one or more tie tubes surrounds at least a portion of the U-bend section, each tie tube being fixed to a plurality of arch bars, thereby fixing said plurality of arch bars with respect to each other. The tie tubes may be circular or semi-circular. Typically each of the tubes in the U-bend section each pass between multiple pairs of flat bars, with each pair of flat bars being formed by flat bars of two adjacent fan bar assemblies. The flat bars on each side may be in pairs (typically part of a larger row of flat bars), or they may be substantially spaced apart.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

It will be understood that the present invention includes any combination of the various features of novelty which characterize the invention and any combination of equivalent features. The embodiments which follow are presented for the purposes of illustration only and are not meant to limit the scope of the present invention. Thus, all the features of the embodiments which follow are interchangeable so that each element of each embodiment may be applied to all of the embodiments taught herein.

BRIEF DESCRIPTION OF THE DRAWINGS

In the accompanying drawings, forming a part of this specification, and in which reference numbers are used to refer to the same or functionally similar elements.

DESCRIPTION OF THE PREFERRED EMBODIMENTS

Figure 1:
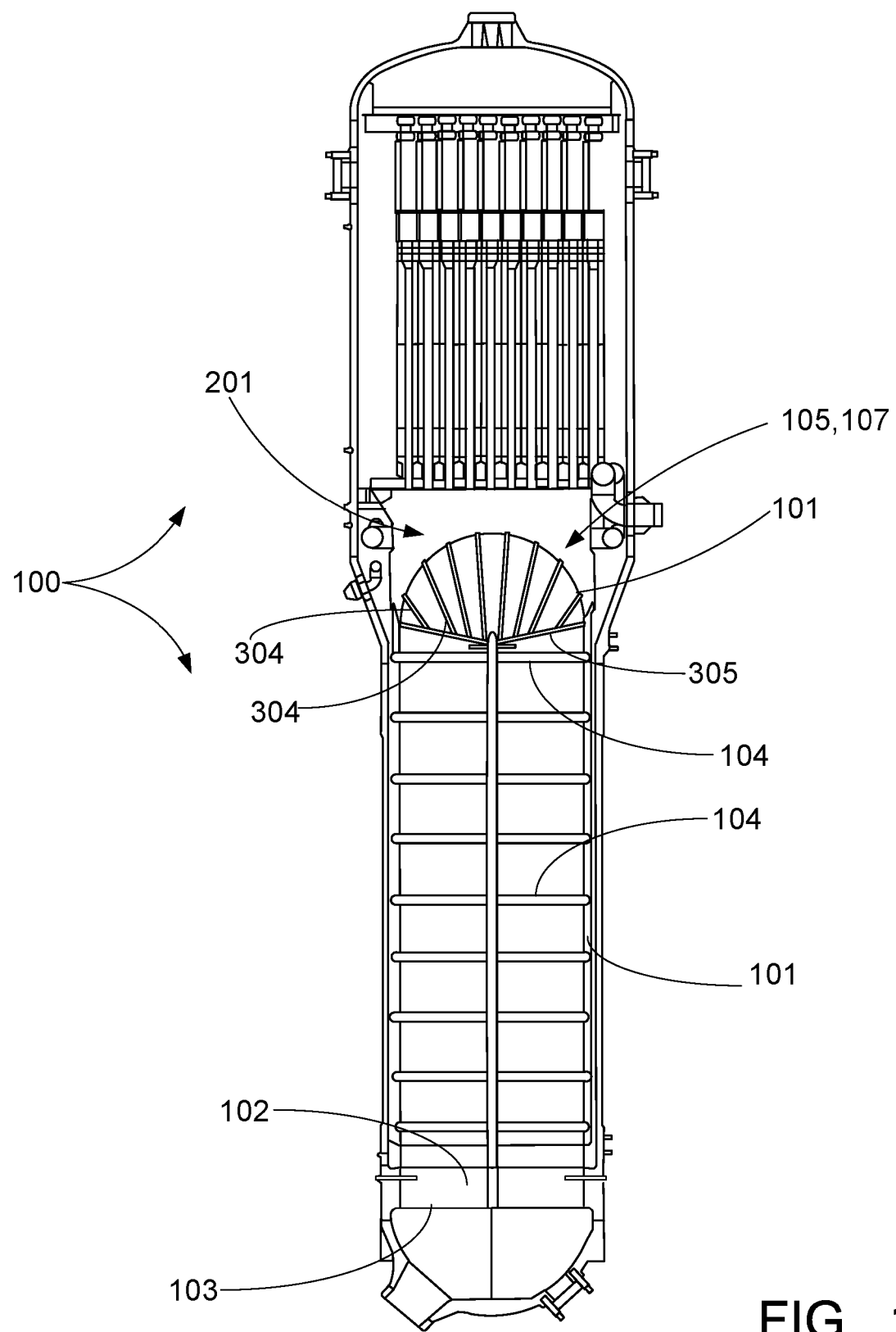
FIG. 1 is a sectional side view of a steam generator with fan bar assemblies.

Referring to FIG. 1, a typical nuclear steam generator 100 has a multiplicity of generally parallel U-tubes 101 (sometimes simply "tubes" 101) which form the heat transfer surface for transfer of heat from the primary heat transport cycle (which cools the nuclear fuel with primary coolant) to the boiler water/secondary coolant (which is evaporated to high pressure steam for turning a steam turbine). A steam generator will typically include far more tubes 101 than are actually depicted in FIG. 1. For example, between 3,000 to 16,000 tubes are used in some steam generators.

Each of the multiplicity of U-tubes may be installed in a tube-sheet 102 and secured and sealed at the tube-ends 103. The tubes 101 are also supported at various points along the straight tube lengths by tube supports 104. The straight lengths will typically be vertical, with each tube including a first vertical section for carrying primary coolant up, and second vertical section for carrying primary coolant back downwards, and a U-bend portion connecting the tops of the two straight vertical sections.

The U-bend section 105 the multiplicity of U-tubes 101 overhangs the upper-most tube support 104 so that, in the absence of any additional U-bend support, each U-bend is freely cantilevered and unrestrained. The U-bends are often quite long and limber, and they are subjected to high velocity two-phase flow, and also to sway forces due to steam generation and flow. As a result, a means of restraining the tubes 101 in the U-bend section 105 above the top-most support 104 of the vertical tube sections is needed. Various U-bend support systems 107 may be employed.

The function of a U-bend support system 107 in a typical steam generator is to i) restrain the many U-bend tubes at a number of points to reduce or prevent flow-induced vibration, and i) to tie the U-bend assembly together in such a way that sway response to lateral handling or seismic loads is in concert, and so that the loads of the highly flexible large-radius tubes are shared with the much stiffer small-radius tubes. If done property this allows the over-hanging U-bend assembly 105,107 to support itself cantilevered above the uppermost tube support 104 without necessarily requiring any direct connection to the vessel or shroud.

Various U-bend support arrangements exist. Flat bar U-bend supports have been used in the design of nuclear steam generators and in heat exchanges for various applications over the years. Alternative U-bend support designs include scalloped bars, wiggle bars, and lattice bars. While the focus on this disclosure is on flat bars, the invention also includes similar arrangements using bars and protuberances of other shapes having varied and/or staggered thicknesses.

Figure 2:
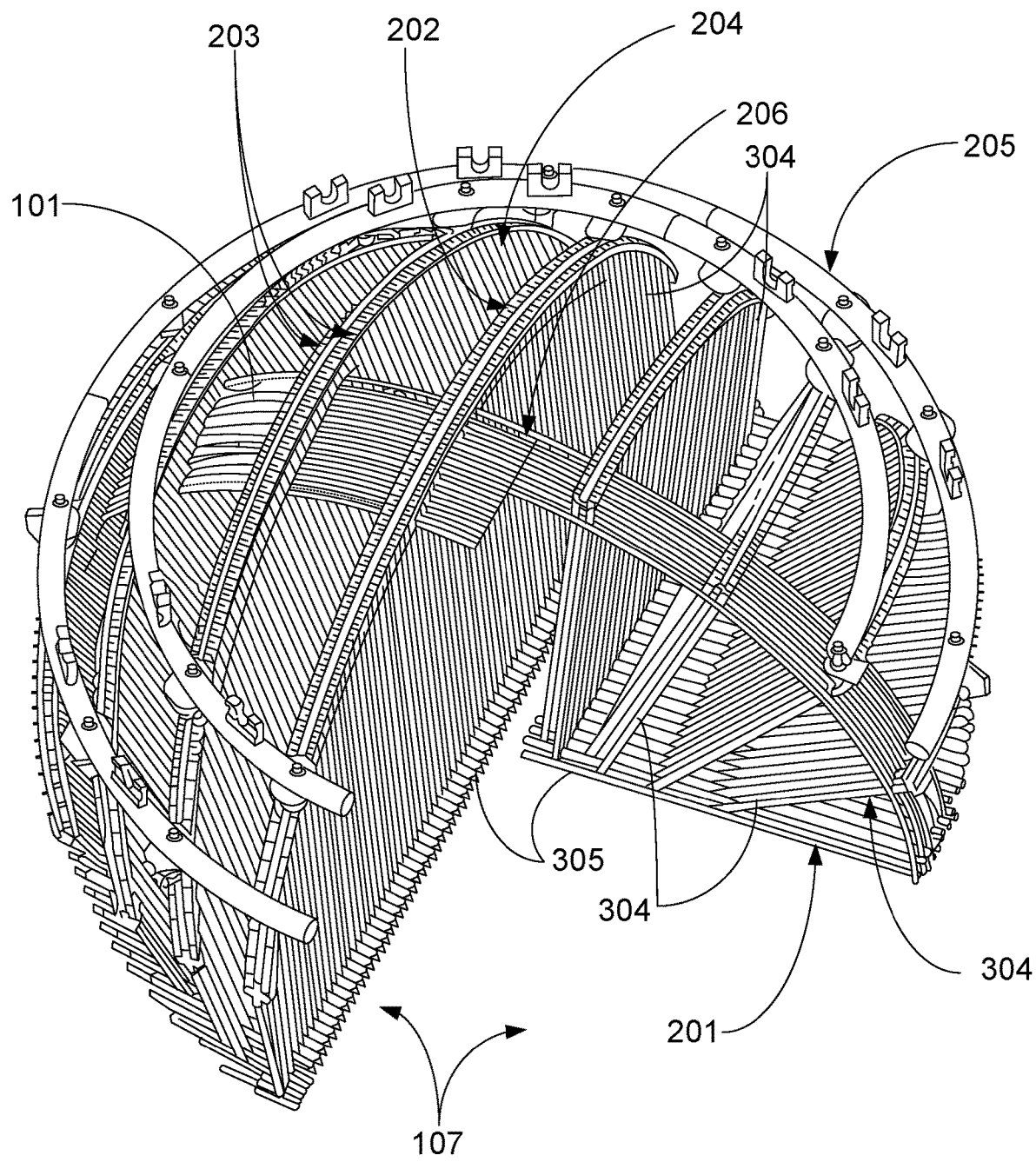
FIG. 2 is a top perspective view of a U-bend support system with one quadrant removed to show internal detail.

In the case of both flat bars and alternative shapes, U-bend support is provided by the placing flat bars 304 in planes between rows of neighboring U-bend tubes 101. In the past, all the bars had the same or substantially the same thickness. See FIG. 2. The bars may be directed radially, vertically, and/or arbitrarily. The bars may be oriented such that each supports equal or near equal spans of the U-bend arc at different radial locations as shown in FIG. 1. The bars are typically attached to an external support structure at the top of the U-bend to secure the bars 304 in a fixed position, at least relative to one another. In some designs, the bars are V-shaped and/or welded to a collector bar 201 to facilitate installation and to limit the movement of the bars along the span of the tubes. The bars 304 can be fully or partially lined-up as in FIGS. 4-5, in a staggered line as shown in FIG. 2, or not in a line. Thus the flat faces of neighboring flat bars 304 may directly face each other (in a straight line), only partially face each other or face just to the side of their neighbors (in a staggered line), or not face a directly adjacent flat bar at all (flat bars not in pairs or lines).

Although simple flat bars are a most-preferred embodiment, similar arrangements can be achieved with "bars" 304 that are other than simply flat, and the various embodiments described herein should be construed to include bars, shafts, spokes, and similar structures 304 allowing for some variation in form.

Staggered flat bars 304 provide tube 101 support with very low flow resistance for passing steam, and with only minimal volume trapped between the support bars and the tubes, which minimizes the problem of dry out and tube fouling at these locations. This may be embodied using bars in a staggered line arrangement as shown in FIG. 2. This arrangement also maintains lateral support while allowing for some in-plane tube 101 movement (i.e. between adjacent bars 304, radially inwards and outwards with respect to the arc shape) that result from thermal expansion. Flat bars provide strong out-of-plane, side-to-side support to the U-bend tubes, which is often the direction where support is most needed, while still allowing some wiggle room in other dimensions for thermal expansion.

The interaction of the flat bars 304 with the tubes also provides vibration damping for both the in-plane and out-of-plane motion. The U-bend tubes may also dilate in the out-of-plane direction under the drag of the hot two-phase (gas and steam) flow of coolant. When such tube dilation occurs, it may result in widening of the gap between adjacent flat bars as the tubes 101 expand to become larger than the (cold) design values. In that situation, the level of anti-vibration support to the tubes, especially in the in-plane (radial) direction, can be substantially reduced. This is especially the case in large tube bundles where tube dilation is significant.

In a preferred embodiment shown at FIG. 2, the tube U-bends 105 (i.e. the tubes 101,206 passing through the U-bend area) are supported, restrained, and positioned by a U-bend support system 107. FIG. 2 only depicts a small number of tubes 101 so that the support system remains visible. A complete assembly would typically include more parallel rows of tubes lateral to the depicted tubes, and also radially inside the depicted U-tubes, so that the U-tubes span most of the depicted hemispherical U-bend area 105. A typical arrangement would include tubes passing though the slot between each of the many side-by-side pairs of flat bars 304 shown in FIG. 2. Typically a vertical stack of many parallel, concentric tubes will pass between each pair of flat bars. Compare FIG. 2 and FIG. 5, which shows stacks of tubes 101 between each pair of adjacent flat bars 304.

The preferred U-bend support system 107 incorporates fan bar assemblies 201, arch bars 202, clamping bars 203, J-tabs 204, and tie tubes 205, as shown in FIG. 2. The array of the fan bar assembly 201 installed in between the tube rows 206 provides support to the tubes. Each fan bar assembly preferably extends outside the U-bend 105. The ends of the fan bar assembly are preferably attached by the clamping bars 203, which may run roughly perpendicular to the tubes 101 following the overall curve of the U-bend area. The clamping bars 203 are mechanically connected to the arch bars 202, which may also may run roughly perpendicular to the tubes following the overall curve of the U-bend area. The arch bars 202 provide structure strength to prevent or substantially prevent movement of the U-bend support system 107, or at least to make any movement by neighboring flat bars occur in unison. At the same time, tie tubes 205 may be employed to preserve the relative distances between the different arch bars such that the U-bend support system 107 is robustly connected. In the depicted embodiment, the two concentric tie tubes 205 are positioned on and around the generally domed, hemispherical U-bend section 105.

Figure 3:
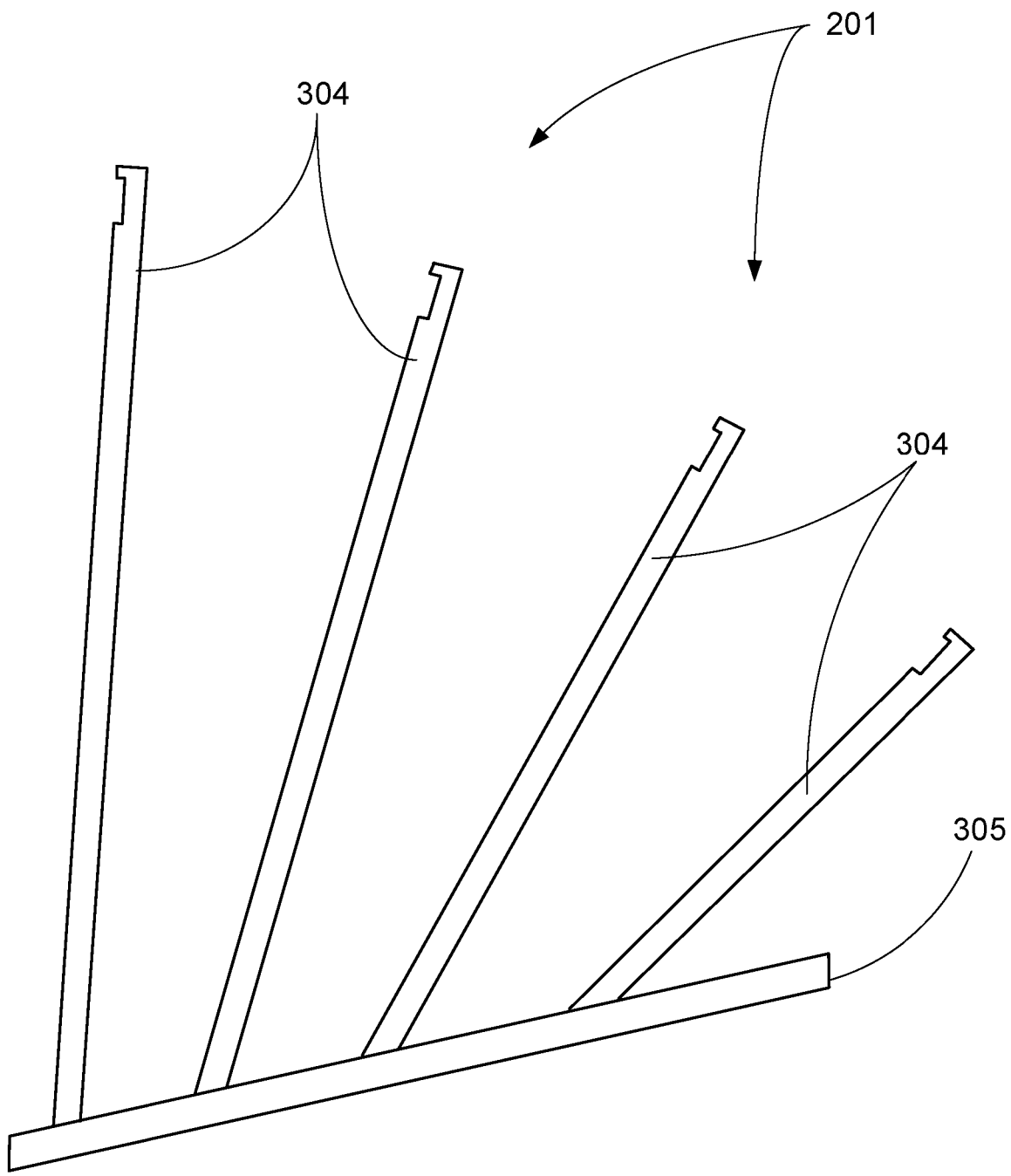
FIG. 3 is a side view of a fan bar assembly including a collector bar and flat bars—8 projecting therefrom.

The details of an exemplary fan bar assembly 201 are shown in FIG. 3. The fan bar assembly 201 is typically made of a number of individual flat bars 304, such as 1, 2, 3, 4, 5, 6, 7, 8, 2-4, 3-5, 2-6, or 3-8 flat bars. The flat bars 394 can be mechanically connected or welded to a collector bar 305 at one end. Flat bars may be provided in end-to-end pairs, and each paired fan bar in a pair may be a mirror image of the other, and/or may include flat bars leaning in an opposite direction as the other. This arrangement ensures that the relative location between the flat bars 304 is maintained for the assembly. Collector bars 305 can be positioned as an additional support for tubes 101 in a manner similar to the flat bars, particularly for the smaller radius tubes which might be supported by fewer or no flat bars 304. In a preferred embodiment each fan bar assembly 201, which may consist of a collector bar and the flat bars fixed to that collector bar, is relatively thin and is generally confined within a common plane. See, e.g., FIG. 3.

The flat bars 304 are typically 1" to 1.5" wide, although other thicknesses and varying thicknesses are possible. Possible widths include 1"-2" wide, 0.5"-2" wide, 0.5"-3" wide, and 0.3"-4" wide. Typically the "thickness" of each flat bar will be less than its width. The bars 304 are also preferably made out of an appropriate material to reduce wear on the surrounding tubes 101. The fan bar assembly 201 is preferably installed in the U-bend 105 such that the collector bar 305 is represents the first support of the tube U-bend. In a preferred embodiment banks of parallel collector bars are all lined up at the bottom of a U-tube support assembly 107, with their respective flat bars 304 projecting upwards between rows of U-bend tubes 101 above.

The thicknesses of the flat bars 304 can be selected based on the desired spacing between the tube 101 columns, based on desired lateral rigidity, and based on the manufacturing tolerances of the different parts. Preferably there are always gaps between the flat bars 304 and the tube columns 101, 206. During operation, even in a tight bundle, the gaps are enlarged, particularly in the upper central regions inside the U-bend 105. This gap enlargement is the result of the relative deflection of the tubes and the U-bend support system 107 under the steam flow forces. The steam flow tends to push the U-tubes in the lateral outward direction as the steam exits the U-bend section 105. This phenomenon is of particular significance in large steam generators. That is because, in large steam generators, the flat bars 304 can be rendered ineffective for steadying the tubes 101 as a result of the enlargement of the gap between the flat bars 304 and the tubes.

Figure 4:
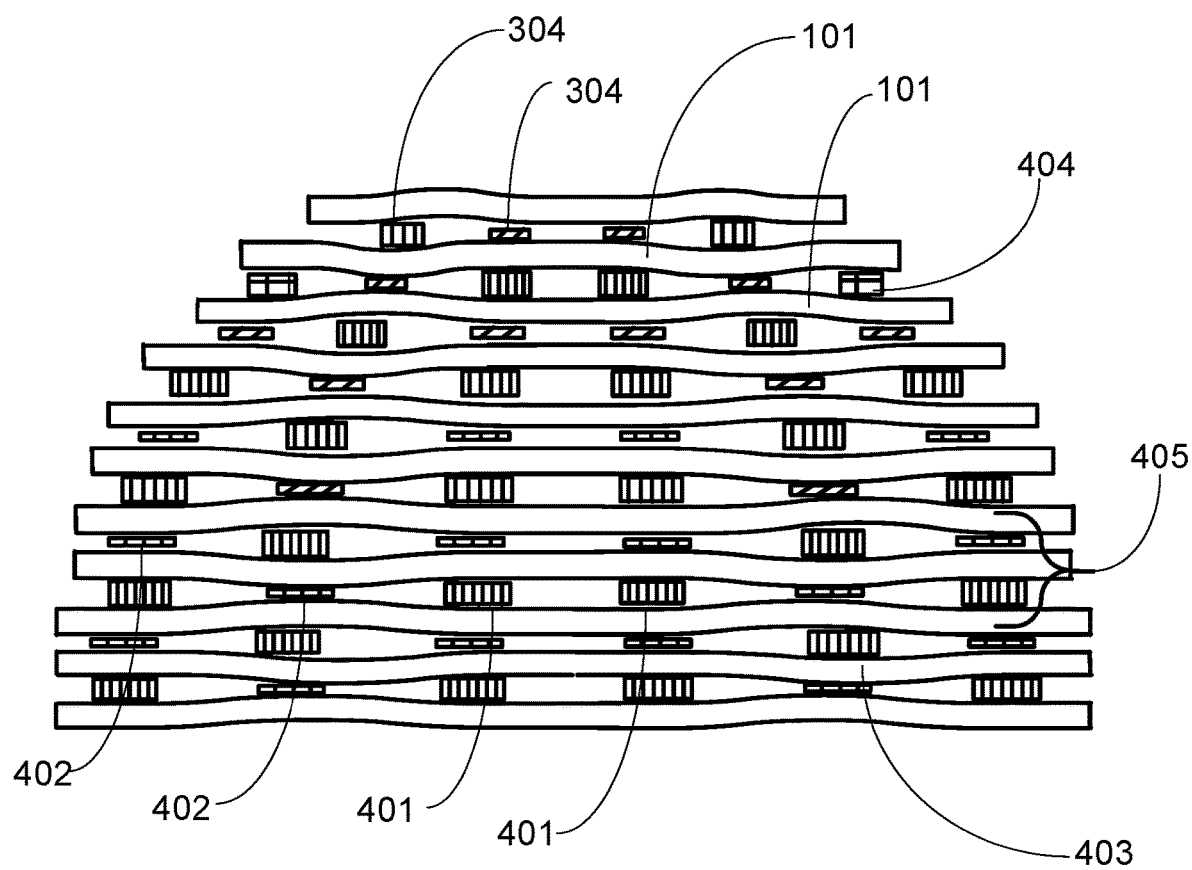
FIG. 4 is a cross-section of part of a U-bend section, with U-tubes running crosswise, and cross-sections of flat bars of varying thickness imparting a serpentine shape to the tubes.

In U-tube bundles, whether tight or not, the enlargement of gaps between tubes and their respective supporting flat bar(s) 304 may be eliminated by deflecting the U-tube 101 to a slightly serpentine shape 403, as shown in FIG. 4. This may be achieved by providing a combination of thicker 401 and thinner 402 flat bars 304 in the U-bend section 105. A preferred alternating thick 401 and thin 402 bar pattern is shown in FIG. 4, although other arrangements can provide an equivalent effect. The thicker/thinner bars 401/402 can be used throughout the U-bend assembly 105, or at only selected planes of the fan bar assemblies 201 to target specific regions of the U-bend section 105. If the alternating thick/thin bars are only provided in a local area of the U-bend support system, the rest of the U-bend support system can be constructed from intermediate thickness flat bars 304 of a uniform or roughly uniform thickness.

Comparing FIGS. 3 and 4, the flat bars 304,401,402,404 in each horizontal line could be part of the same fan bar assembly 201, being attached to the same collector bar 305 below. Alternatively each horizontal row might be two fan bar assemblies oriented end-to-end and positioned in a common plane. For example, two fan bar assemblies as in FIG. 3 in a line and oriented with the flat bars all facing out and away from their mutual center. The flat bars in FIG. 4 are in rows, the rows running bottom-to-top in this depiction, but which would typically run side-to-side in a real steam generator. In this embodiment each row alternates between thick 401 and thin 402 flat bars, imparting a serpentine shape to the U-tubes 101 running across the rows. Intermediate thickness flat bars 404 are present as well. Some of the depicted rows are not perfectly straight, and include adjacent flat bars which are partially offset from one another. In this depiction each flat bar forms a pair with the flat bar immediately above it, and also with the flat bar immediately below it, where applicable. Most of the flat bar pairs in FIG. 4 are asymmetrical pairs 405, formed by one thick flat bar 401 and one adjacent thin flat bar 402. Flat bars within a row which are slightly offset from each other but still neighboring, e.g. still the closest flat bars in an adjacent fan bar assembly, are still considered to be adjacent flat bars. For example, flat bars at the upper left of FIG. 4 which are not perfectly lined up, being part of a curved row, are still "adjacent" to the nearest flat bars above and below them even where they do not directly face each other.

In some embodiments the thick flat bars may be at least 1.2 times, at least 1.5 times, or at least 2 times the thickness of the thin bars. The thin bar could be defined as the thinnest bar in each arrangement, in each row, and/or in each fan bar arrangement.

The thicker bars 401 can be at the location of any of the flat bars 304 depending on the required offset of the tubes. The location of the thicker bars 401 can be different from one fan bar assembly 201 to the other. For example, the neighboring bars 304 of neighboring fan bar assemblies 201 may be alternatingly thick and thin between neighboring bars in each assembly and/or between neighboring bars in adjacent assemblies, as shown in FIG. 4. This alternating pattern can be used to provide a serpentine pattern in tubes 101 passing between the bars. The difference in thickness between the thicker and thinner flat bars is preferably greater than or equal to the average gap between the tubes 101 and the bars 304,401,402. The average gap is calculated using the average thickness of the flat bars (401 & 402). The average gap calculation should take into account dilation during normal operation.

A serpentine U-tube pattern can also be achieved or enhanced by positioning flat bars in each fan bar set further towards one side or another of each fan bar assembly, as opposed to only using thicker and thinner bars lined up straight down the center of each fan bar assembly. For example, flat bars of a uniform thickness within each fan bar assembly might be alternatingly offset slightly to the left or to the right moving down the length of each fan bar and proceeding down the length of a collector bar 305 below. A flat bar offset towards one side could function similarly to a thick flat bar in that location, at least with respect to that side.

Preferably the total assembly height or thickness in the U-bend array (typically including alternating rows of bars 304 and tubes 101 and any spaces) is the same at all locations. In some preferred embodiments the number of thinner bars 402 is equal to the number of the thicker flat bars 401 in any given side-to-side row of flat bars 304 within a row of adjacent fan bar assemblies. Average thickness flat bars 304,404, with thicknesses intermediate between the thick and thin bars, can also be introduced, if required, at any plane or position in the U-bend section 105. This is shown from different perspectives in FIGS. 4 & 5.

FIG. 4 shows an example arrangement of thicker bars 401 and thinner bars 402 in the U-bend section, setting and maintaining the path of a set of laterally adjacent tubes. Typically all of these tubes would be arced, such as out of the plane of the figure, although that curve is not visible from this view. See, for comparison, the tubes 101 in FIG. 2. The bars 304 of FIG. 4 are sectional views and project towards the viewer. The cumulative deflection of each tube from the center to the top plane may be a function of the difference in flat bar 401,402 thicknesses and the number of tube planes. This cumulative deflection is achieved with limited external force required since the tubes act similarly to linear springs connected in series. The spring-like action of flexed tubes causes points on each tube to be resiliently held against some of the flat bars. This will tend to be the thick flat bars 401 because thick bars stick further out into the path of the tubes, although the tubes may be pressed against intermediate and thin flat bars as well. The total required force should be calculated to ensure that external forces during operation will not push the tubes 101 away from at least some of the flat bars 401,402,403. Preferred embodiments advantageously maintain resilient, spring loaded contact between each tube (or at least many of the tubes) and at least some flat bars at all times, preferably with at least one or at least two flat bars on each side, regardless or temperature, pressure and, turbulence.

As mentioned previously, in contrast to FIG. 2, a complete U-tube assembly would typically include more parallel rows of tubes lateral to the depicted tubes, and also rows of tubes radially inside the depicted U-tubes. As such, U-tubes closer to the left and right edges of the hemispherical U-bend section 105, and closer to the radial center of the U-bend section, will have smaller radii. U-tubes towards the radial outside, and which are closer to the center or "equator" of the hemispherical section, will have greater radii, including for example the tubes depicted in FIG. 2. The U-tubes with smaller bend radius are much typically stiffer than the radial outer tubes with larger bend radii but having the same tube thickness. This is at least partially due to greater leverage on the large bend radii tubes, which project further up and out beyond the vertical tube supports 104. As a result of this greater rigidly, the thicker/thinner bars 401/402 can be tapered down, if required, to regular thickness bars closer to the collector bar 305 below, and/or starting at a certain distance from the top end of the bars, to reduce the displacement force on the smaller radii tubes in the small bend radius zones.

Figure 5:
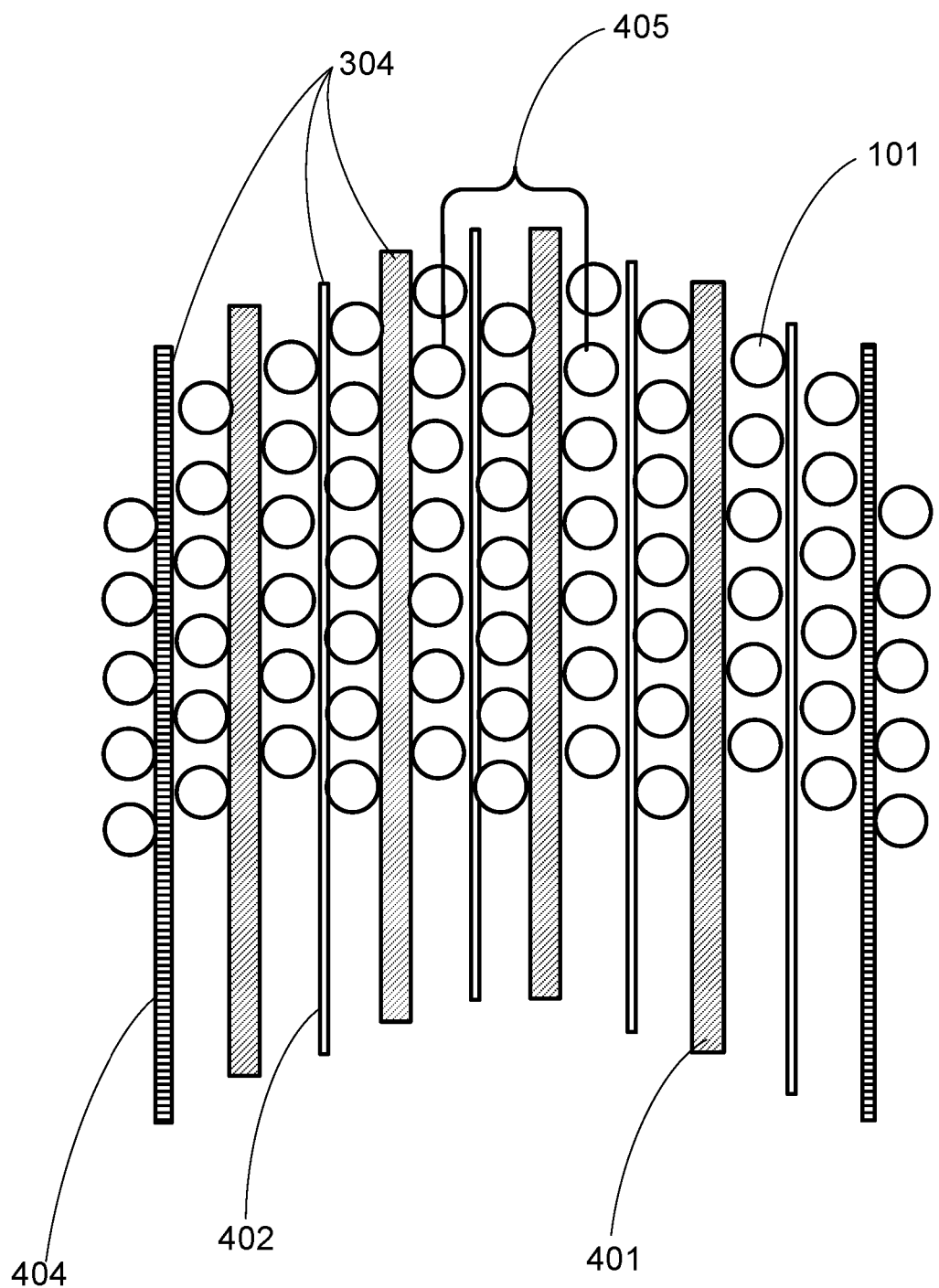
FIG. 5 is a different cross-section of part of a U-bend section, with parallel vertical flat bars of varying thicknesses, and cross-sections of several rows of U-tubes.

FIG. 5 shows a sectional view of several neighboring rows of U-bend tubes 101 passing between thick 401, thin 402, and standard thickness 404 flat bars 304. Due to displacement by the alternating thick and thin flat bars, the tubes 101 would continue in a slightly serpentine, waving pattern as they continued into and out of the plane of the figure. The serpentine pattern, visible in FIG. 4, is not visible in FIG. 5. The flat bars would typically project generally upwards and outwards from a collector bar 305 below.

The preferred improved support system 107 design provides an alternating offset to the U-bend section of the steam generator U-tube bundle. This new feature may be implemented using standard industry manufacturing procedures. Adding the offset ensures that gaps between fan bars 304 and the tubes 101 are either eliminated or substantially reduced. Preferably the cumulative offset of the tubes exceeds the dilation of the U-bend region during operation.

This alternating thickness arrangement introduces a snaking, alternating lateral bias to the tubes as they pass though successive gaps between successive pairs of neighboring flat bars 304. This bias ensures that each tube is always pressed into contact with at least one flat bar at each support point along the tube, and preferably multiple flat bars on each side. In preferred embodiments each tube, or at least some tubes, are held by at least 1, at least 2, at least 3, or at least 4 flat bars on both sides as they traverse the U-bend zone. This arrangement provides improved support for the U-tubes under changing conditions of heat and pressure, which conditions cause tubes and other components to change in size and shape and to move relative to each other. In particular, the biases in the tubes hold them against flat bars (which provide support and stabilization) as the tubes 101 dilate and constrict due to temperatures changes. This flexible biasing also allows for gaps of varying sizes between pairs of flat bars and tubes passing therebetween. The resilient pressure between flat bars (especially thick flat bars) and tubes maintains contact and lateral support of the tubes even if the tubes move up and down or radially due to temperature changes. It also maintains, or at least restores, support and contact after transient movement or vibrations.

This design has multiple parameters that can be adjusted for use with different steam generator size and bundle arrangements. These parameters include the thicknesses of the thicker, thinner, and intermediate bars, the location and arrangement patterns of the thicker, thinner, and intermediate bars, the number of each type of flat bar 304, and the number, size, arc, and composition of the tubes.

An advantage of this design is that it provides adaptable, reliable support across all areas of the U-bend tube region under a variety of hot operating conditions, as well as at rest. Deceptively simple structures—fan bar assemblies 201 having flat bars 304 of varying thicknesses—are able to elegantly support U-tubes 101 as they dilate and constrict, and regardless of varying gaps between flat bars and the tubes passing between them.

This invention can be applied to any U-bend support arrangement of the flat bar type, and is not limited to the fan bar design illustrated in FIG. 3. It should be understood that the concept of supporting flexed tubes between thicker and thinner supports can be applied using structures other than "flat bars", such as alternative elongated structures. The invention also is not limited to use with "U-tubes" in an arced rainbow configuration and traversing a hemispherical U-bend section, as in FIG. 2.

The invention is conceived of as an improved steam generator, as an improved U-bend support assembly, as improved fan bar assemblies for supporting U-tubes, as an improved tube and tube support system, and as a generally applicable method and type of support structure, using bars or other structured of varying thickness and/or in a staggered pattern, to impart a serpentine shape to elongated structures and to support elongated structures as they go through small shifts in size, shape, temperature, and pressure.

While a specific embodiment of the invention has been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention. Thus, all the features of all the embodiments disclosed herein are interchangeable so that any element of any embodiment may be applied to any of the embodiments taught herein.

The invention claimed is:

1. A steam generator for use in a nuclear power plant, the steam generator comprising a plurality of generally parallel tubes for receiving hot primary coolant from a nuclear reactor core, and for circulating said primary coolant within the steam generator for transferring heat from the primary coolant, through the tubes, and into surrounding secondary coolant for heating the secondary coolant to produce steam;
   wherein a first vertical portion of each of the tubes is generally vertical for carrying primary coolant upwards, and wherein a different second vertical portion of each of the tubes is generally vertical for carrying primary coolant back downwards;
   wherein the plurality of tubes collectively comprise a U-bend section, the U-bend section comprising a bending, upwardly convex portion of each of the tubes which connects the first vertical portion of each tube with the second vertical portion of each respective tube for passage of primary coolant between respective vertical portions;
   the steam generator further comprising a U-bend support assembly supporting the tubes in the U-bend section, the U-bend support assembly being at least partially encompassed by the U-bend section;
   the U-bend support assembly comprising a plurality of fan bar assemblies, the fan bar assemblies being in fixed positions relative to each other;
   each fan bar assembly comprising a laterally projecting collector bar and a plurality of flat bars projecting from the collector bar, wherein each collector bar and its corresponding flat bars are all substantially within a common plane, and wherein the flat bars project generally upwards from their respective collector bar and also, optionally, towards a side;
   wherein the fan bar assemblies of the U-bend support assembly are positioned laterally adjacent to one another such that the collector bars of the fan bar assemblies are lined up parallel to other collector bars at the bottom of the U-bend support assembly, and such that the flat bars project upwards between neighboring tubes in the U-bend section and thereby limit the motion of those tubes;
   wherein the tubes in the U-bend section each pass between multiple pairs of flat bars, with each pair of flat bars being formed by flat bars of two adjacent fan bar assemblies; wherein each flat bar has a thickness;
   wherein within at least some fan bar assemblies the flat bars do not all have the same thickness, with some flat bars in the assembly being thick flat bars and other flat bars being thin flat bars which are thinner than the thick flat bars;
   wherein at least some pairs of flat bars are asymmetrical pairs, the asymmetrical pairs being formed by a thick flat bar of one fan bar assembly and a thin flat bar of an adjacent flat bar assembly which are adjacent to each other;
   wherein at least some of the tubes within the U-bend section each pass through a plurality of asymmetrical pairs of flat bars, with a portion of each of said tubes being laterally displaced by the thick flat bar of at least one asymmetrical pair, and with part of said tubes within the U-bend section having a serpentine shape maintained by said displacement by one or more thick flat bars.

2. The steam generator of claim 1, wherein at least some of the tubes passing through the U-bend section each pass through a plurality of asymmetrical pairs of flat bars, with said tubes each being laterally deflected in a first direction by a thick flat bar of at least one asymmetrical pair, and with different portions of said same tubes being laterally deflected in a different second direction by the thick flat bar of a different asymmetrical pair;
   wherein said tubes are tensionally held against said thick flat bars, thereby supporting said tubes against movement in at least two different directions.

3. The steam generator of claim 1, wherein the U-bend section is hemispherical.

4. The steam generator of claim 1, wherein the collector bars of the fan bar assemblies are substantially horizontal.

5. The steam generator of claim 1, wherein the collector bars of the fan bar assemblies are substantially horizontal, and wherein the flat bars of each collector bar are all tilted in the same direction with respect to a line normal to the collector bar.

6. The steam generator of claim 1, wherein one or more tubes each pass between the collector bars of adjacent fan bar assemblies both where they enter and where they leave the U-bend section.

7. The steam generator of claim 1, wherein at least some of the fan bar assemblies comprise three or more flat bars.

8. The steam generator of claim 1, wherein different fan bar assemblies include different numbers of flat bars.

9. The steam generator of claim 1,
wherein one or more elongated arch bars are each connected to a plurality of flat bars in different fan bar assemblies, thereby fixing the flat bars connected to each arch bar with respect to said other flat bars connected to the same arch bar.

10. The steam generator of claim 1, wherein the U-bend section is hemispherical;
wherein two or more elongated arch bars are each connected to a plurality of flat bars in different fan bar assemblies, thereby fixing the flat bars connected to each arch bar with respect to said other flat bars connected to the same arch bar; and
wherein one or more tie tubes surround at least a portion of the U-bend section, and wherein each tie tube is fixed to a plurality of arch bars, thereby fixing said plurality of arch bars with respect to each other.

11. The steam generator of claim 1,
wherein the U-bend support assembly comprises at least five fan bar assemblies, each fan bar assembly comprising a plurality of flat bars projecting from a collector bar, and with the collector bars of said at least five fan bar assemblies being lined up parallel to one another at the bottom of the U-bend support assembly;
wherein the at least five fan bar assemblies collectively form at least one row of flat bars, with each row of flat bars comprising one flat bar from each fan bar assembly, and with each row of flat bars running transverse to the orientation of the collector bars; and
wherein the flat bars in each row may be either directly lined up or in a staggered line.

12. The steam generator of claim 1,
wherein the U-bend support assembly comprises at least five fan bar assemblies, each fan bar assembly comprising a plurality of flat bars projecting from a collector bar, and with the collector bars of said at least five fan bar assemblies being lined up parallel to one another;
wherein the at least five fan bar assemblies collectively form at least one row of flat bars, with each row of flat bars comprising one flat bar from each fan bar assembly, wherein the flat bars in each row may be either directly lined up or in a staggered line, and with each row of flat bars running transverse to the orientation of the collector bars; and
wherein at least one row of flat bars includes at least five consecutive neighboring flat bars which alternate between thick flat bars and thin flat bars, with each adjacent pair of said alternating thick and thin flat bars forming an asymmetrical pair of flat bars.

13. The steam generator of claim 1,
wherein the U-bend support assembly comprises at least ten fan bar assemblies, each fan bar assembly comprising a plurality of flat bars projecting from a collector bar, and with the collector bars of said at least ten fan bar assemblies being lined up parallel to one another;
wherein the at least ten fan bar assemblies collectively form at least two rows of flat bars, with each row of flat bars comprising one flat bar from each fan bar assembly, wherein the flat bars in each row may be either directly lined up or in a staggered line, and with each row of flat bars running transverse to the orientation of the collector bars; and wherein at least two rows of flat bars each include at least five consecutive neighboring flat bars which alternate between thick flat bars and thin flat bars, with each adjacent pair of said alternating thick and thin flat bars forming an asymmetrical pair of flat bars.

14. The steam generator of claim 1, wherein at least some of the asymmetrical pairs are formed by a thick flat bar and a thin flat bar from adjacent fan bar assemblies, with the thick flat bar and the thin flat bar being lined up and having faces which directly oppose each other.

15. The steam generator of claim 1, wherein at least some of the asymmetrical pairs are formed by a thick flat bar and a thin flat bar from adjacent fan bar assemblies, with the thick flat bar and the thin flat bar being adjacent to each other but having faces which are at least partially offset and not directly facing each other.

16. A steam generator for use in a power plant, the steam generator comprising a plurality of generally parallel tubes for receiving hot primary coolant from outside the steam generator, and for circulating said primary coolant within the steam generator for transferring heat from the primary coolant, through the tubes, and into surrounding secondary coolant for heating the secondary coolant to produce steam;
wherein a first vertical portion of each of the tubes is generally vertical for carrying primary coolant upwards, and wherein a different second vertical portion of each of the tubes is generally vertical for carrying primary coolant back downwards;
wherein the plurality of tubes collectively comprise a U-bend section, the U-bend section comprising a bending, upwardly convex portion of each of the tubes which connects the first vertical portion of each tube with the second vertical portion of that tube for passage of primary coolant between respective vertical tube portions;
the steam generator further comprising a U-bend support assembly supporting the tubes in the U-bend section;
the U-bend support assembly comprising a plurality of fan bar assemblies;
each fan bar assembly comprising a collector bar and one or more flat bars projecting from the collector bar;
wherein the fan bar assemblies of the U-bend support assembly are positioned laterally adjacent to one another such that the collector bars of the fan bar assemblies are adjacent to one another, and such that the flat bars in each fan bar assembly project between neighboring tubes in the U-bend section and thereby limit the motion of those tubes;
wherein the tubes in the U-bend section each pass between flat bars on two opposite first and second sides of each tube, with the flat bars on said two opposite sides being flat bars from two different adjacent fan bar assemblies;
wherein each flat bar has a thickness;
wherein the flat bars do not all have the same thickness, with some flat bars being thick flat bars and other flat bars being thin flat bars which are thinner than the thick flat bars;
wherein at least some of the tubes within the U-bend section contact and are maintained in a laterally displaced position by one or more thick flat bars, with parts of said tubes having a serpentine orientation caused by said lateral displacements.

17. The steam generator of claim 16,
wherein the tubes in the U-bend section each pass between flat bars on two opposite first and second sides of each tube;

wherein said tubes pass both thick flat bars and thin flat bars on their first side, and also pass both thick flat bars and thin flat bars on their second side; and wherein the tubes are each contacted and maintained in a laterally displaced position by one or more flat bars from both their first side and their second side, and parts of the tubes are thereby maintained in a serpentine orientation.

18. The steam generator of claim 16, wherein the U-bend support assembly comprises at least five fan bar assemblies, each fan bar assembly comprising a plurality of flat bars projecting from a collector bar, and with the collector bars of said at least five fan bar assemblies being lined up parallel to one another;

wherein the at least five fan bar assemblies collectively form at least one row of flat bars, with each row of flat bars comprising one flat bar from each fan bar assembly, wherein the flat bars in each row may be either directly lined up or in a staggered line, and with each row of flat bars running transverse to the orientation of the collector bars; and wherein at least one row of flat bars includes at least five consecutive neighboring flat bars which alternate between thick flat bars and thin flat bars.

19. The steam generator of claim 16, wherein one or more elongated arch bars are each connected to a plurality of flat bars in different fan bar assemblies, thereby fixing the flat bars connected to each arch bar with respect to each other; and wherein one or more tie tubes surround at least a portion of the U-bend section, and wherein each tie tube is fixed to a plurality of arch bars, thereby fixing said plurality of arch bars with respect to each other.

20. The steam generator of claim 16, wherein the tubes in the U-bend section each pass between multiple pairs of flat bars, with each pair of flat bars being formed by flat bars of two adjacent bar assemblies; and wherein at least some pairs of flat bars are asymmetrical pairs, the asymmetrical pairs being formed by a thick flat bar of one fan bar assembly and a thin flat bar of an adjacent flat bar assembly which are adjacent to each other.

\* \* \* \* \*